United States Patent
Hansen et al.

(10) Patent No.: US 10,999,972 B2
(45) Date of Patent: May 11, 2021

(54) HARVESTING MACHINE HAVING A SECONDARY CLEANING SYSTEM

(71) Applicant: DEERE & COMPANY, Moline, IL (US)

(72) Inventors: Matthew J. Hansen, Thibodaux, LA (US); Dusk S. Mixon, Thibodaux, LA (US); Kerry J. Morvant, Thibodaux, LA (US); Surfraj Fattepur, Pune (IN)

(73) Assignee: DEERE & COMPANY, Moline, IL (US)

(*) Notice: Subject to any disclaimer, the term of this patent is extended or adjusted under 35 U.S.C. 154(b) by 266 days.

(21) Appl. No.: 16/178,709

(22) Filed: Nov. 2, 2018

(65) Prior Publication Data
US 2020/0137955 A1    May 7, 2020

(51) Int. Cl.
*A01D 45/10*    (2006.01)
*A01D 43/08*    (2006.01)

(52) U.S. Cl.
CPC .......... *A01D 45/10* (2013.01); *A01D 43/086* (2013.01)

(58) Field of Classification Search
CPC .. A01D 45/10; A01D 43/086; A01D 41/1217; A01D 41/1276; A01F 12/444; A01F 29/12
See application file for complete search history.

(56) References Cited

U.S. PATENT DOCUMENTS

| | | | | |
|---|---|---|---|---|
| 3,788,048 A * | 1/1974 | Stiff | ...................... | A01D 45/10 55/406 |
| 3,830,046 A * | 8/1974 | Rollitt | ..................... | A01D 45/10 56/16.5 |
| 4,019,308 A * | 4/1977 | Quick | .................... | A01D 45/10 56/13.9 |
| 4,154,047 A * | 5/1979 | Quick | .................... | A01D 45/10 56/13.9 |
| 4,263,772 A * | 4/1981 | Phillips | ................... | A01F 29/12 56/13.3 |
| 5,031,392 A * | 7/1991 | Baker | .................... | A01D 45/10 460/123 |

(Continued)

FOREIGN PATENT DOCUMENTS

WO    WO-2018037543 A1 *    3/2018    ............. A01D 45/10

*Primary Examiner* — Arpad Fabian-Kovacs
(74) *Attorney, Agent, or Firm* — Taft Stettinius & Hollister LLP; Stephen F. Rost

(57) ABSTRACT

A separator for a crop harvester configured to harvest sugarcane. The separator includes a frame having: i) an inlet configured to receive cut sugarcane, wherein the cut sugarcane includes cut stalk and crop residue, ii) a cut stalk outlet configured to discharge the cut stalk from the frame; and iii) a crop residue outlet. An extractor is operatively connected to the crop residue outlet. The extractor includes a tapered nozzle disposed adjacently to the crop residue outlet and a fan disposed adjacently to the tapered nozzle, wherein the tapered nozzle is configured to provide a pressure differential between the crop residue outlet and the fan in response to air flow provide by the fan. The tapered nozzle, in one embodiment, is a truncated cone having a smaller end disposed adjacently to a flow of cut crop, wherein the fan draws air through the truncated cone to separate the crop residue from the cut stalk.

16 Claims, 7 Drawing Sheets

(56) References Cited

U.S. PATENT DOCUMENTS

| | | | | |
|---|---|---|---|---|
| 5,092,110 A * | 3/1992 | Dommert | ............... | A01D 45/10 |
| | | | | 209/139.1 |
| 6,272,819 B1 * | 8/2001 | Wendte | ................ | A01D 41/127 |
| | | | | 460/6 |
| 6,508,049 B1 * | 1/2003 | Cox | ....................... | A01D 45/10 |
| | | | | 56/10.2 R |
| 6,869,356 B2 * | 3/2005 | Hinds | ..................... | A01D 45/10 |
| | | | | 460/70 |
| 9,119,346 B2 * | 9/2015 | Vergote | .................. | A01D 45/10 |
| 10,076,076 B2 | 9/2018 | Craig et al. | | |
| 10,344,993 B2 * | 7/2019 | Gettig | .................... | A01D 46/20 |
| 10,412,888 B2 * | 9/2019 | Matway | ............. | A01D 41/1271 |
| 10,645,876 B2 * | 5/2020 | Dugas | ................... | A01F 12/444 |
| 2015/0327438 A1 * | 11/2015 | Cazenave | ............... | A01D 45/10 |
| | | | | 56/51 |
| 2017/0108000 A1 * | 4/2017 | Junior | .................. | F04D 29/384 |
| 2017/0251601 A1 * | 9/2017 | Dugas | .................. | A01F 12/444 |
| 2019/0082600 A1 * | 3/2019 | Nicora | .................. | A01D 45/10 |

* cited by examiner

US 10,999,972 B2

HARVESTING MACHINE HAVING A SECONDARY CLEANING SYSTEM

FIELD OF THE DISCLOSURE

The present invention generally relates to a harvesting machine, and more particularly to a system and method for harvesting sugarcane with a sugarcane harvesting machine.

BACKGROUND

Agricultural equipment, such as a tractor or a self-propelled harvester, includes mechanical systems, electrical systems, hydraulic systems, and electro-hydraulic systems, configured to prepare fields for planting or to harvest crops.

Harvesters of various configurations, including sugarcane harvesters, have harvesting systems of various types. Harvesting systems for a sugarcane harvester, for example, include assemblies or devices for cutting, chopping, sorting, transporting, and otherwise gathering and processing sugarcane plants. Typical harvesting assemblies, in different embodiments, include a base cutter assembly (or "base cutter"), feed rollers, and cutting drums.

To actively harvest crops, the sugarcane harvester gathers and processes material from rows of sugarcane plants. In the case of one type of sugarcane harvester, the gathered sugarcane stalks are cut into billets that move through a loading elevator to an elevator discharge, where the cut sugarcane stalks are discharged to a collector, such as the sugarcane wagon. Leaves, trash, and other debris are separated from the billets and ejected onto the field.

In various harvesters, harvesting assemblies are hydraulically powered by an engine-driven pump or electrically powered by a generator or other electrical power supply. The harvesting assemblies include rotating drums that move the cut stalks toward a chopper. The rotating drums are driven by a hydraulic motor or an electric motor that rotationally drives the roller to continuously move the billets to the wagon or other container. The motors include splines that engage the roller to drive the roller about a rotation axis.

The sugarcane, once cut, forms what is known as a "mat" of sugarcane. The sugarcane harvester feeds the mat to a chopping section where it is chopped, including the stalk which is cut into segments. The sugarcane harvester advances the billets along with crop residue (e.g., leafy material) to a primary extractor that separates at least a portion of the crop residue from the billets and removes the crop residue from the sugarcane harvester. However, some crop residue can remain with the billets as the billets travel up the elevator for discharge into a wagon or other container to be hauled away. In different embodiments, the sugarcane harvester includes a secondary extractor that separates crop residue from the billets and discharges the separated crop residue from the sugarcane harvester. In some embodiments, however, the removal of the crop residue from the billets is not satisfactory and requires additional cleaning of the billets.

What is needed therefore is a sugarcane harvester including a harvesting system having a secondary extractor to improve the removal of the crop residue from the billets.

SUMMARY

In one embodiment there is provided a separator for a crop harvester configured to harvest sugarcane. The separator includes a frame having i) an inlet configured to receive cut sugarcane, wherein the cut sugarcane includes cut stalk and crop residue, ii) a cut stalk outlet configured discharge the cut stalk from the frame, and iii) a crop residue outlet. An extractor is operatively connected to the crop residue outlet. The extractor includes a tapered nozzle disposed adjacently to the crop residue outlet and a fan disposed adjacently to the tapered nozzle, wherein the tapered nozzle is configured to provide a pressure differential between the crop residue outlet and the fan in response to air flow provide by the fan.

In one example of this embodiment, the extractor includes a chamber surrounding the fan and the nozzle includes a nozzle inlet located at the frame and a nozzle outlet located adjacent to the fan, wherein the flow of air provided by the fan moves from the nozzle inlet to the nozzle outlet to provide the increased velocity to extract crop residue from the sugarcane mat. In a second example of this embodiment, the nozzle inlet includes a first perimeter and the nozzle outlet includes a second perimeter, wherein the first perimeter is smaller than the second perimeter to provide a tapered nozzle. In a third example of this embodiment, there is a fan housing defining the chamber, wherein the fan housing includes a housing inlet and a housing outlet, wherein the second perimeter of the nozzle outlet is substantially the same size as a perimeter of the housing inlet.

In a fourth example of this embodiment, the nozzle is located within the frame. In a fifth example of this embodiment, there is a nozzle plate located within the frame and including an aperture operatively connected to an inlet of the nozzle. In a sixth example of this embodiment, the frame defines a space between the nozzle and an interior wall of the frame, wherein the nozzle plate extends from the nozzle inlet to the interior wall. In a seventh example of this embodiment, there is provided a seal located at the nozzle plate and the nozzle inlet, wherein the seal is configured to provide a substantially airtight seal between the nozzle inlet and the aperture of the nozzle plate. In an eighth example of this embodiment, the cut sugarcane defines a path defining an arc and the nozzle inlet defines a plane generally parallel to a tangent line defined by the arc of the path.

In another embodiment there is provided a sugarcane harvester for harvesting sugarcane including a cutter configured to cut sugarcane into cut stalk and crop residue and a primary extractor. The primary extractor is disposed adjacent to the cut sugarcane and is configured to remove a portion of the crop residue from the cut stalk. An elevator includes a conveyor to move the cut stalk and crop residue to an end of the conveyor. A frame is located at an end of the conveyor, and an extractor is operatively connected to the frame. The extractor includes a tapered nozzle to remove crop residue from the cut stalk at the end of the conveyor.

In one example of this embodiment, there is provided a fan located adjacently to the nozzle, wherein the nozzle and the fan are configured to provide an air flow of increased velocity between the frame and the fan to extract crop residue from the sugarcane mat. In a second example of this embodiment, the frame includes a crop residue outlet, the extractor includes a chamber surrounding the fan, and the nozzle includes a nozzle inlet, located at the crop residue outlet, and a nozzle outlet, located adjacent to the fan, and the flow of air provided by the fan moves from the nozzle inlet to the nozzle outlet to provide the increased pressure to extract crop residue from the sugarcane mat. In a third example of this embodiment, the nozzle inlet includes a first perimeter and the nozzle outlet includes a second perimeter, wherein the first perimeter is smaller than the second perimeter to provide a tapered nozzle. In a fourth example of this embodiment, there is provided a fan housing defining the chamber, wherein the fan housing includes a housing inlet and a housing outlet. In a fifth example of this embodiment, there is provided a nozzle plate located within the frame and including an aperture operatively connected to the nozzle inlet. In a sixth example of this embodiment, the frame defines a space between the nozzle inlet and an interior wall of the frame, wherein the nozzle plate extends from the nozzle inlet to the interior wall.

In a further embodiment, there is provided a method of harvesting sugarcane from a field of sugarcane. The method includes: cutting sugarcane from the field of sugarcane to obtain cut stalk and crop residue; delivering the cut stalk and the crop residue to a first chamber; and providing a pressure differential between the first chamber and a second chamber to remove the crop residue from the cut stalk.

In one example of this embodiment, the providing an air flow of increased velocity includes providing an air flow of increased velocity with a tapered nozzle. In a second example of this embodiment, the providing an air flow of increased velocity includes providing an air flow of increased velocity with a fan located in the second chamber configured to draw air from the first chamber through the sugarcane mat. In a third example of this embodiment, the providing an air flow of increased velocity includes locating a smaller end of the tapered nozzle adjacently to the first chamber and locating a larger end of the tapered nozzle adjacently to the second chamber.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

Figure 1:
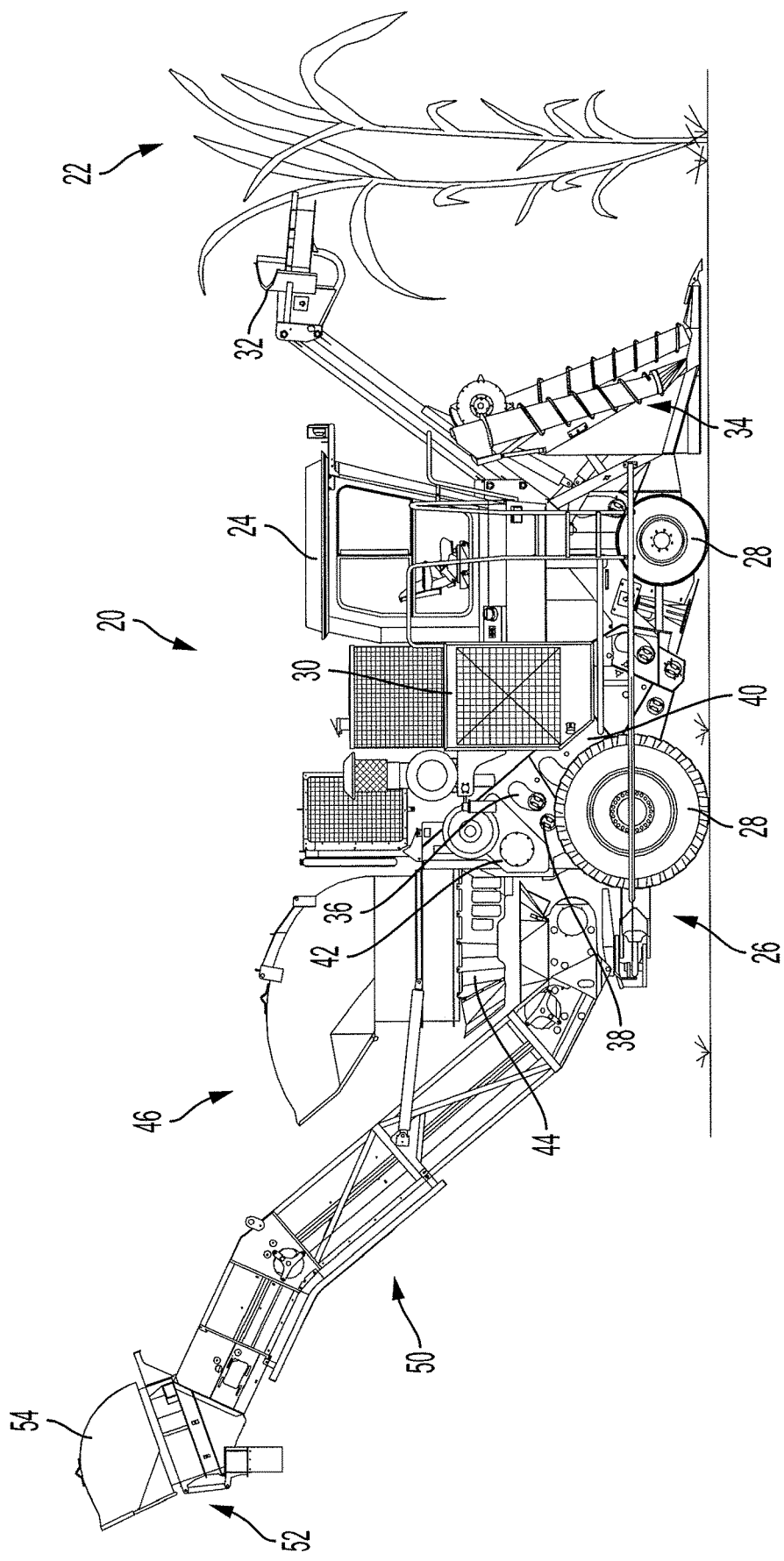
FIG. 1 illustrates a side elevational view of a work vehicle, and more specifically, of an agricultural vehicle such as a sugarcane harvesting machine.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

FIG. 1 illustrates a side view of a sugarcane harvester 20 adapted to cut sugarcane 22, with the front of the harvester 20 facing to the right. Accordingly, certain components of the harvester 20 may not be visible in FIG. 1. The harvester 20 includes a cab 24 located on a main frame 26 that is supported by wheels 28 configured to move the harvester along rows of sugarcane 22. An engine is located within a housing 30 that moves the wheels 28 along a field to continually cut the sugarcane 22 for harvesting. In different embodiments, the engine also powers various driven components of the harvester 20. In certain embodiments, the engine directly powers a one or more hydraulic pumps (not shown) and other driven components powered by the hydraulic motors via an embedded hydraulic system (not shown).

A cane topper 32 extends forward of the frame 26 in order to remove the leafy tops of sugarcane plants 22. A set of crop dividers 34 guides the stalks of sugarcane toward internal mechanisms of the harvester 20 for processing. As the harvester 20 moves across a field, sugarcane plants passing between the crop dividers 34 are deflected downward by one or more knockdown rollers before being cut near the base of the plants 22 by a base cutter assembly, as would be understood by one skilled in the art. Rotating disks, guides, or paddles (not shown) on the base cutter assembly further direct the cut ends of the plants upwardly and rearward within the harvester 20 toward successive pairs of upper feed rollers 36 and lower feed rollers 38. The feed rollers 36 and 38 are supported by a feed roller chassis 40 which is supported by the main frame 26. The upper and lower feed rollers 36 and 38 convey the stalks toward a chopper drum module 42 for chopping the stalks into billets.

The chopper drum module 42 include upper and lower chopper drums that rotate in opposite directions in order to chop the moving stalks into billets, as would be understood by one skilled in the art. The billets, including crop residue, are propelled into a cleaning chamber 44 that is located at the base of a primary extractor 46. The primary extractor 46, in different embodiments, includes a powered fan to extract the crop residue, trash, and debris from the cleaning chamber 44. A loading elevator 50, with a one end located at the bottom of the cleaning zone 44, conveys the cleaned billets upward to a discharge location 52, below a secondary extractor 54, where the billets discharged into a truck, a wagon, a container, or other receptacle that collects the discharged billets. The secondary extractor 54 separates the crop residue from the cut stalk to clean the cut stalk.

Figure 2:
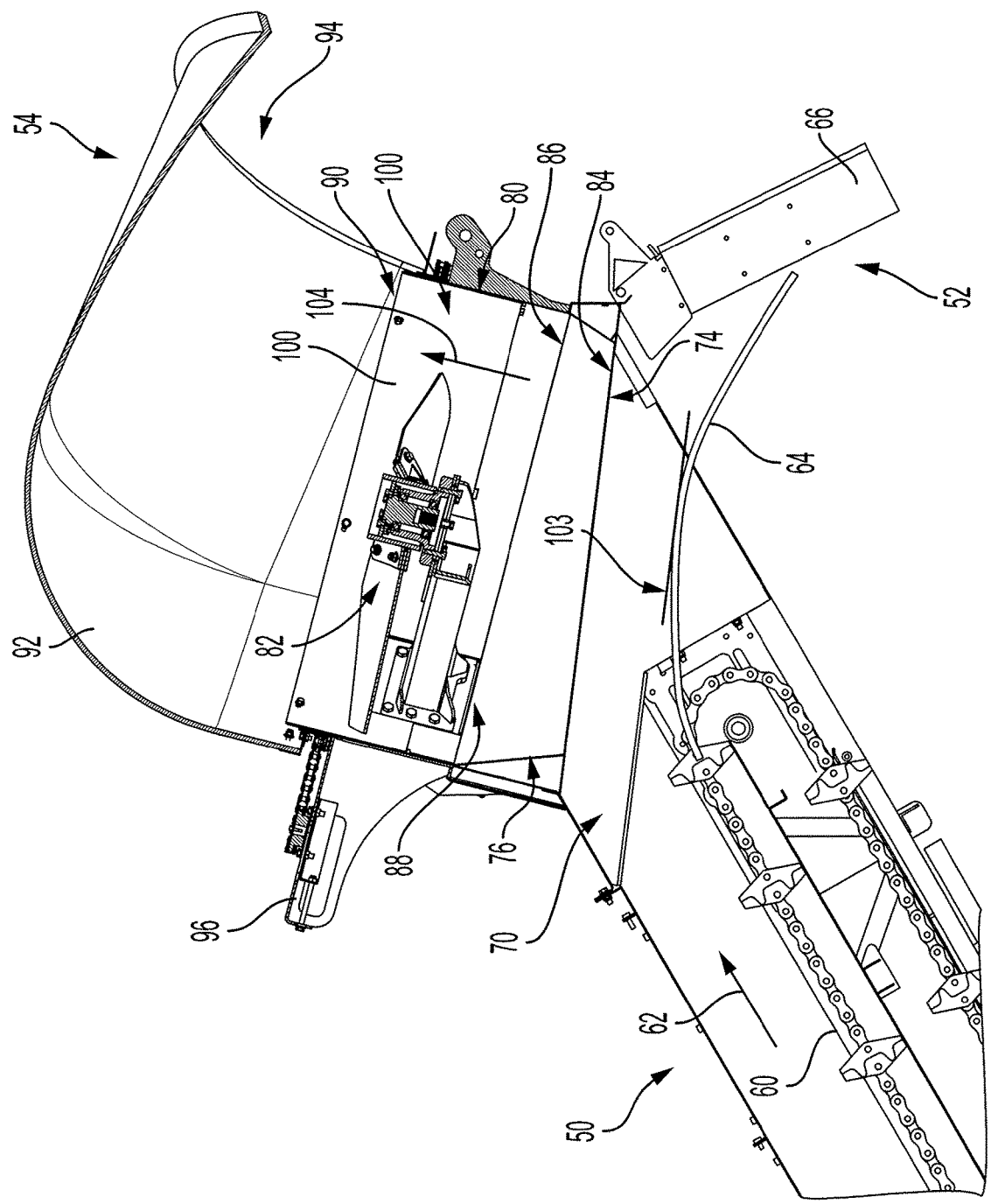
FIG. 2 illustrates a side sectional view of an secondary extractor coupled to an elevator.

FIG. 2 illustrates a sectional view of a portion of the loading elevator 50 and the secondary extractor 54 located at an end of the conveyor. The elevator 50 includes a conveyor belt 60 having a top surface moving in a direction 62 carrying billets and crop residue toward the discharge location 52. The secondary extractor 54 is located at the end of the elevator 50 and is configured to remove the crop residue from the billets that travel along a path 64. The secondary extractor 54 includes a deflector 66 that deflects billets in a generally downward direction toward the wagon.

Figure 3:
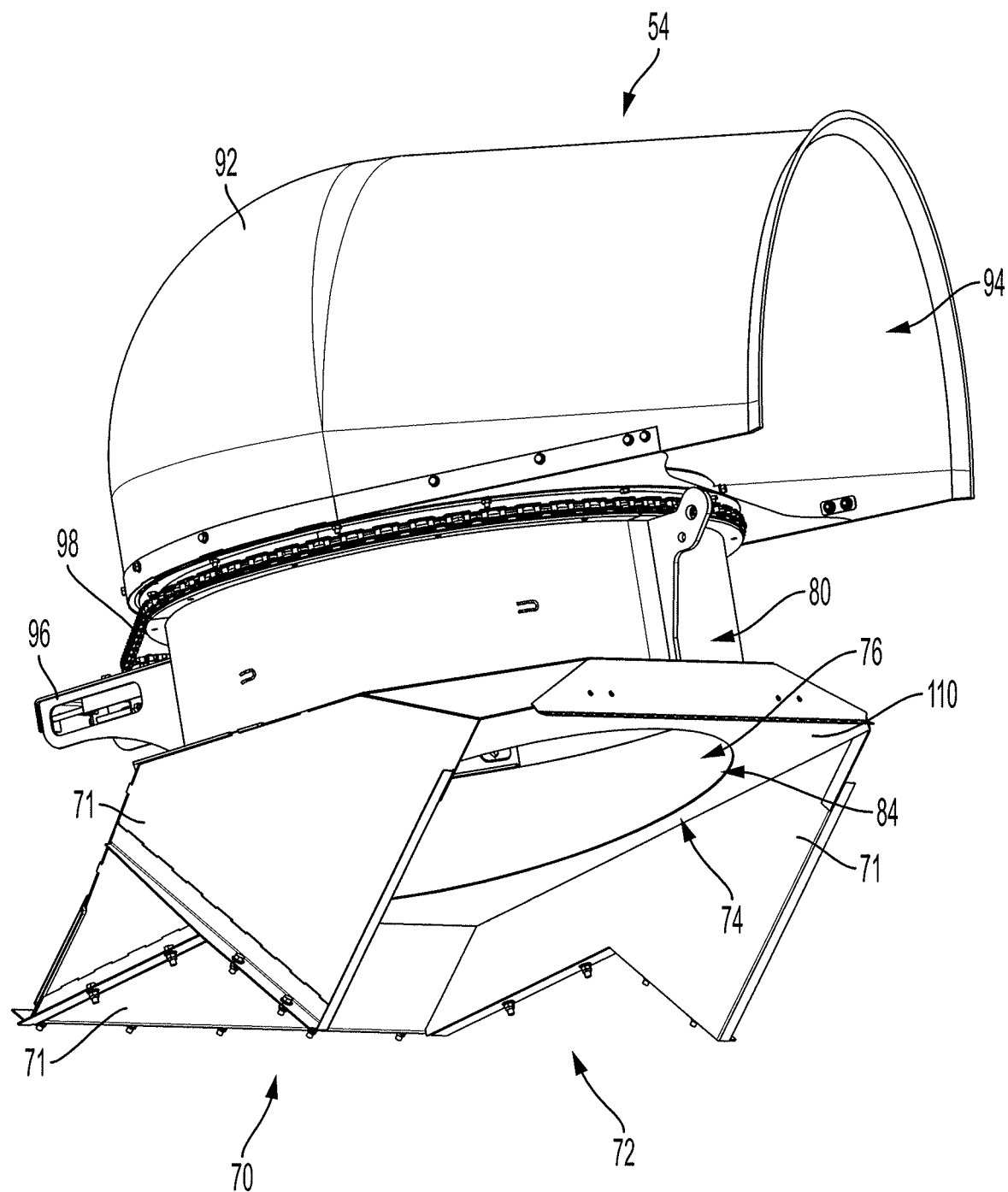
FIG. 3 illustrates a first perspective view of a secondary extractor.

A frame 70, see also FIGS. 2 and 3, is configured to couple the secondary extractor 54 to the elevator 50. The frame 70 includes a plurality of sides 71 defining an inlet 72 and a crop residue outlet 74. As the crop residue and the billets travel along the path 64, the secondary extractor 54 removes crop residue from the inlet 72 which then moves toward the crop residue outlet 74. A tapered nozzle 76 is located at the crop residue outlet 74 of the frame 70.

As seen in FIG. 3, a fan housing 80 is located adjacently to the nozzle 76 and defines a chamber in which a fan 82 is located. The fan 82 is fixedly coupled to the fan housing 80 and rotates at a speed of between 700 and 1400 revolutions per minute to extract the crop residue from the billets as the billets move along the path 64. The crop debris, due to weighing less than the billets, is pulled away from the billets into the crop residue outlet 74, through the nozzle 76, and into the fan housing 80. The nozzle 76 includes a nozzle inlet 84, located at the crop residue outlet 74 of the frame 70, and a nozzle outlet 86 located at a housing inlet 88 of the fan housing 80. The fan housing 80 includes an outlet 90. A hood 92 is rotatably coupled to the housing 80 at the outlet 90. Crop residue moves from the crop residue outlet 74, through the nozzle 76, through the fan housing 80, through the hood 92, and out of the hood through a hood outlet 94. A platform 96 supports a motor (not shown) that drives a chain 98 to rotate the hood with respect to the frame 70 and to direct crop residue exiting the hood outlet 92 to a preferred location.

In one embodiment, the fan housing 80 is a generally cylindrical structure defining the chamber in which the fan 82 is located. In the illustrated embodiment, the housing inlet 88 and the housing outlet 90 include perimeters of the same size. In one embodiment, the housing inlet 88 and the housing outlet 90 have circumferences of the same length. Other perimeters and lengths are contemplated. In one or more embodiments, a wear ring 100 is located within the housing 80 adjacent to the fan 82 to protect the interior of the housing from flying debris (crop residue and other materials). In one embodiment, the wear ring 100 is formed of a plastic material and is replaceable when worn.

In one embodiment, the nozzle 76 is located within the frame 70, as illustrated in FIGS. 2 and 3, or in another embodiment within the housing 80. The nozzle inlet 84 and the nozzle outlet 86 each define an aperture having a perimeter, which in one embodiment is a circumference of a circle. The length of the perimeter of nozzle inlet 84 is less than the length of the perimeter of nozzle outlet 86 such that the nozzle 76 defines a truncated cone having a channel extending from the nozzle inlet 84 to the nozzle outlet 86. The tapered nozzle 76 restricts the flow of air at the nozzle inlet 84, which increases the flow air provided by the fan 82 to extract crop residue from the billets.

Figure 4:
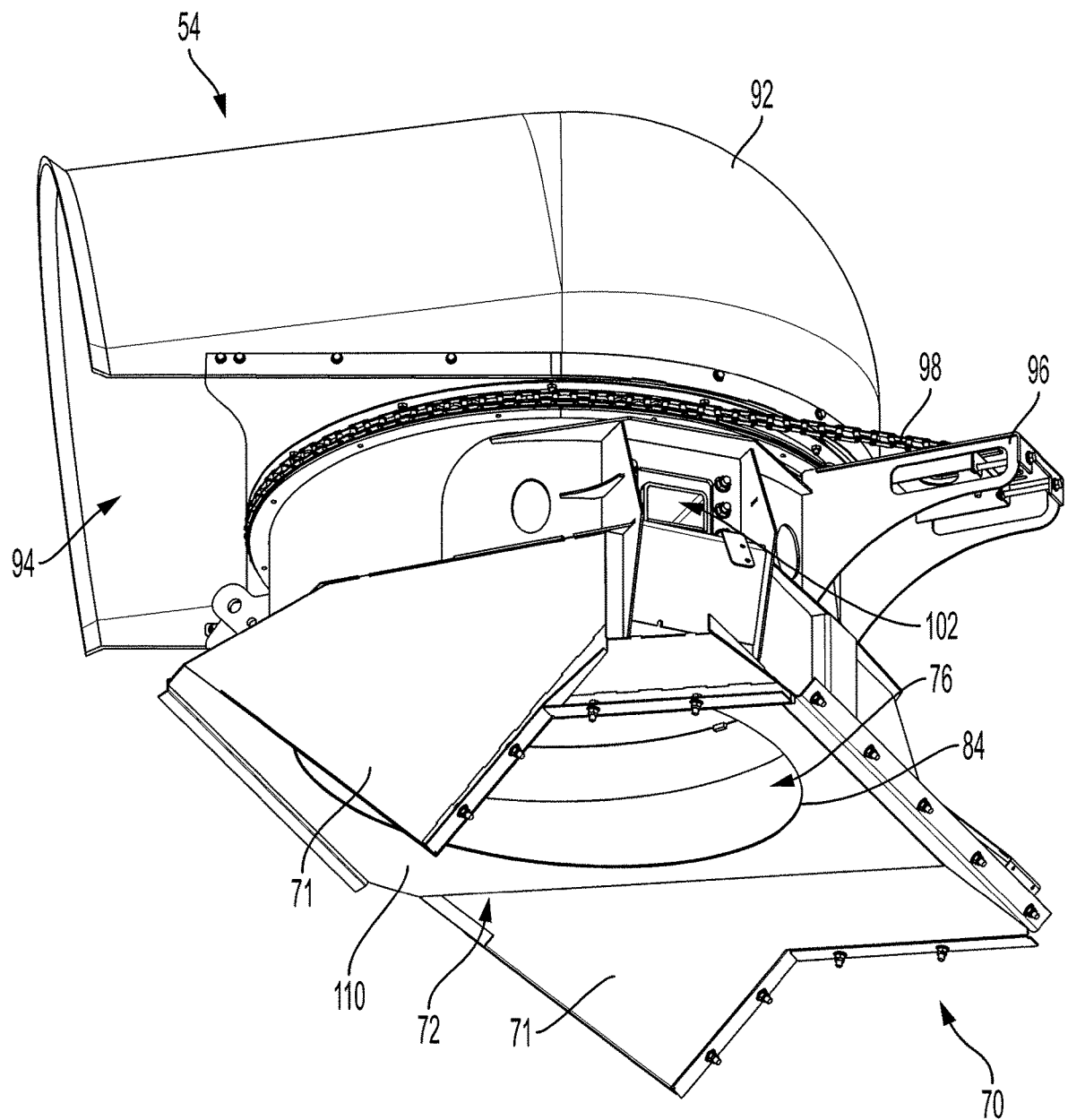
FIG. 4 illustrates a second perspective view of a secondary extractor.

The housing 80 includes a wiring aperture 102 configured to supply operating power to the fan 84 as illustrated in FIG. 4. As the fan 82 rotates, the fan generates a flow of air in a direction 104 (see FIG. 2) which provides a negative pressure to move crop residue from the path 64 and through the channel of nozzle 76.

The nozzle inlet 84 generally defines a plane which is aligned with respect to the path 64 to achieve a desired extraction of the crop residue from the billets. In one embodiment, the plane defined by the nozzle inlet 84 is generally parallel to a tangent 103 defined by the path 64 of the billets moving to the discharge location. The path 64 is parabolic in shape and its tangent is used, in one or more embodiments, to determine the angle of the nozzle inlet 84 with path 64.

In one embodiment, the nozzle inlet 84 is located in close proximity to the tangent 103 to remove crop residue from the sugarcane mat moving along the path 64. The distance of the nozzle inlet 84 to the tangent 103 is based on the speed of the fan and the size of the nozzle. In another embodiment, the nozzle is not a tapered nozzle, but is instead a generally cylindrical nozzle having a predetermined diameter with an inlet in close proximity to the path 64. In this embodiment, the generally cylindrical nozzle extends from the housing 80 into the frame 70. In one or more embodiments, the generally cylindrical nozzle includes a diameter less than a diameter of the housing 80. Other diameters are contemplated.

The distance of the nozzle inlet from the sugarcane mat at the path 64 is determined based on the speed of the fan, the size of nozzle inlet, or the size of the nozzle outlet. The distance of the nozzle from the path and the fan speed are selected to withdraw a substantial amount of crop residue from the sugarcane mat such that the remaining sugarcane billets flow along the path 64 to the deflector 66.

As seen in FIG. 4, a nozzle plate 110 is located within the frame 70 and extends from the nozzle inlet 84 to the interior surface of the frame sides 72. An interface between the nozzle plate 110 and the nozzle inlet 84 is generally sealed such that air flow provided by the fan is directed though the nozzle 76. The interface of the plate 100 with the interior surfaces of the frame sides 72 is also generally sealed to insure movement of air through the nozzle, as well as providing a pressure differential from the nozzle inlet 84 to the nozzle outlet 86 to increase pressure and/or air flow velocity to extract crop residue from the cut stalk.

Figure 5:
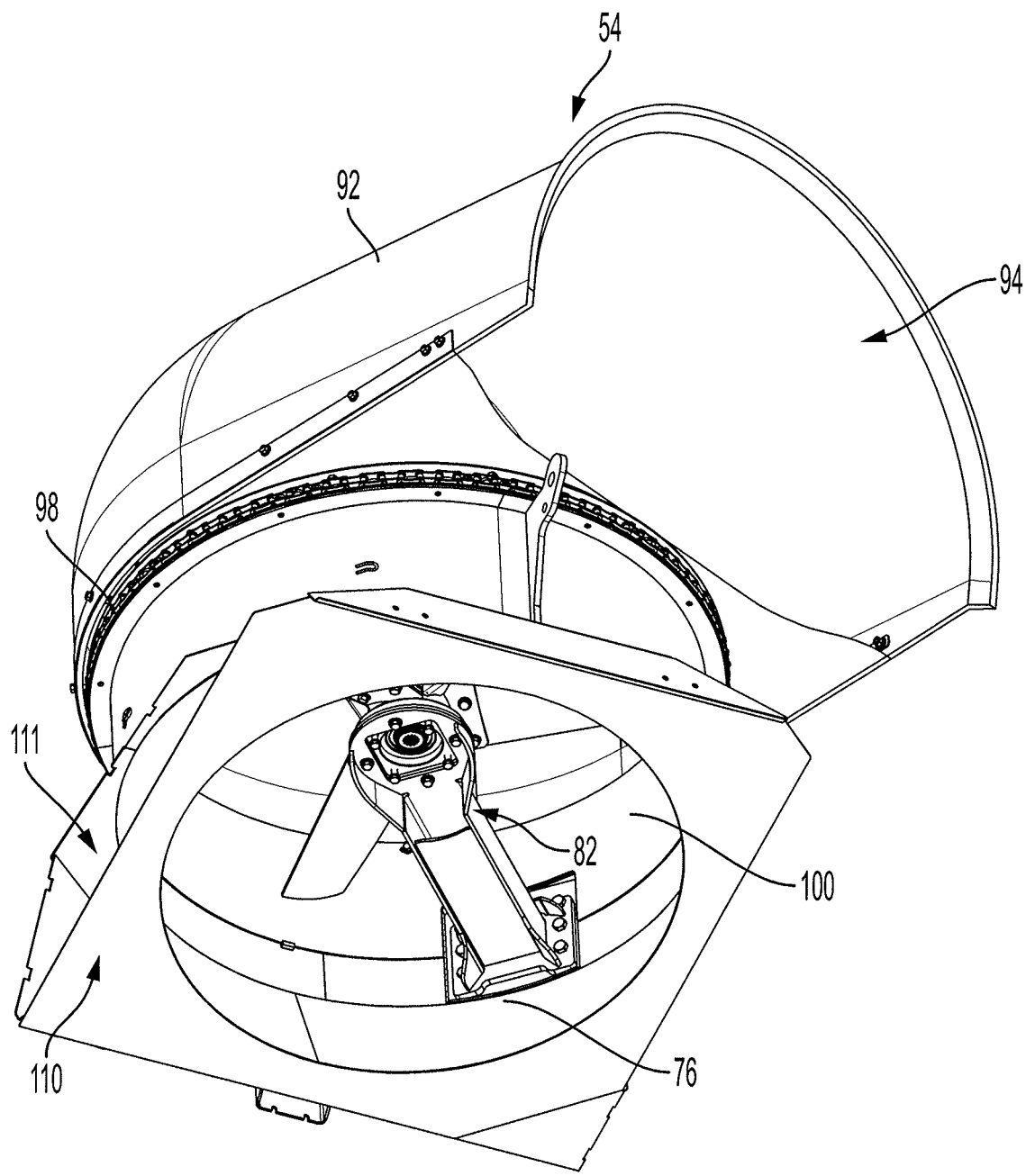
FIG. 5 illustrates a bottom perspective view of a secondary extractor without a frame.

FIG. 5 illustrates the secondary extractor 54 without the frame 70 being connected to the plate 110. The lack of the frame 70 illustrates a space 111 between an outside surface of the nozzle 76. The space 111 is sealed by the frame 70 and the plate 110, when the frame is in place. The combination of the frame 70 and nozzle plate 110 cooperate to direct airflow through the channel of the nozzle 76 to provide the pressure differential.

Figure 6:
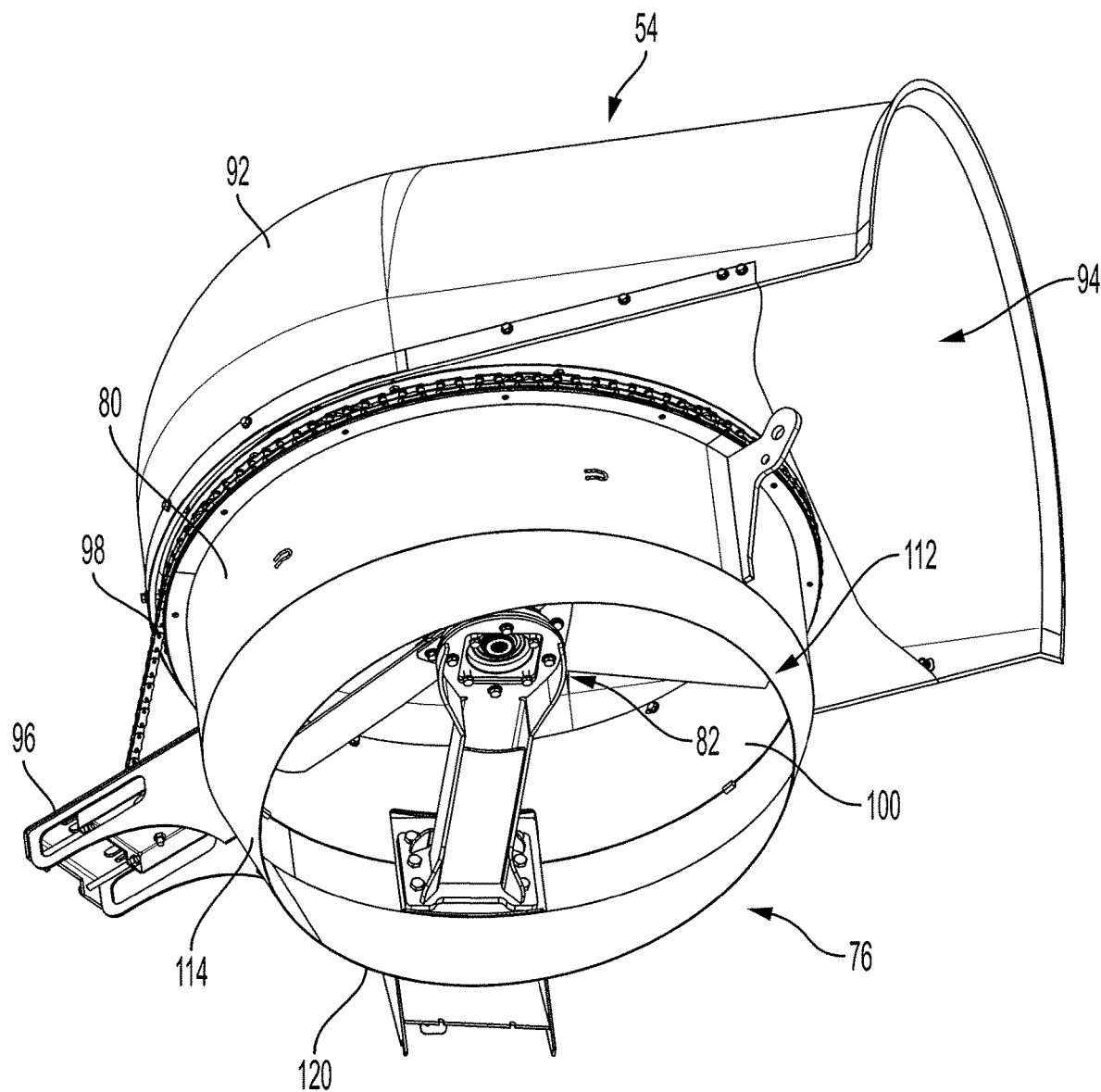
FIG. 6 illustrates a bottom perspective view of a secondary extractor without a frame and without a nozzle plate.
Figure 7:
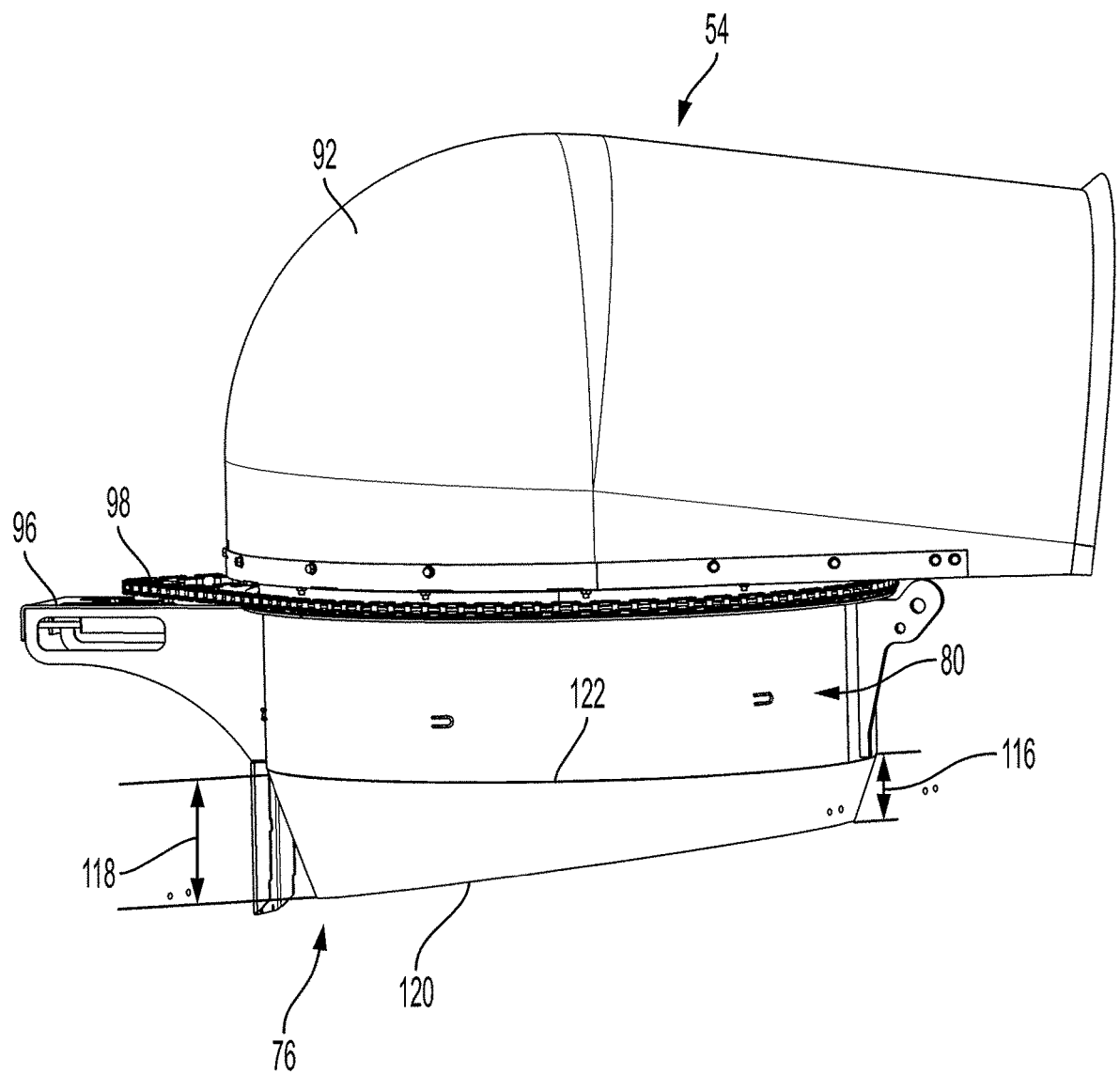
FIG. 7 illustrates a side elevational view of a secondary extractor without a frame and without a nozzle plate.

As further illustrated in FIGS. 6 and 7, the nozzle 76 includes a front wall 112 and a rear wall 114 from the perspective of the deflector 66. A length 116 of the front wall 112 is less than a length 118 of the rear wall 114. An edge 120 at the nozzle input 84 is continuous from the front wall 112 to the rear wall 114. The edge 120 is generally inclined with respect to an edge 122 of the nozzle output 86.

As described herein, the velocity and direction of air flow provided by the fan is determined by one or more of fan speed, the internal volume of the tapered nozzle, the angle of the wall(s) of the tapered nozzle, the angle of the plane defined by the nozzle input with respect to the path. By knowing the speed of elevator, the velocity and direction of air flow provided by the fan and the configuration of the tapered nozzle are determined to provide for an optimum extraction of crop debris from the billets. In one embodiment, the speed of the fan is reduced when a tapered nozzle as described herein is incorporated into a secondary extractor. A reduction in fan speed improves the lifespan of the fan while providing air flow sufficient to extract crop residue from the material being transported by the elevator. Consequently, the incorporation of a tapered nozzle provides for an optimum flow of air delivered by the fan.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A separator for a crop harvester configured to harvest sugarcane, the separator comprising:
 a frame having an interior wall, the frame including a frame inlet configured to receive a sugarcane mat;
 an extractor operatively connected to the frame, the extractor including a tapered nozzle having an inlet, the tapered nozzle located within the frame and disposed adjacently to the sugarcane mat and a fan disposed adjacently to the tapered nozzle, wherein the tapered nozzle and fan are configured to provide an air flow through the sugarcane mat at an increased velocity to remove crop reside from the mat; and a nozzle plate located within the frame and including an aperture operatively connected to the inlet of the tapered nozzle, wherein the nozzle plate extends from the nozzle inlet to the interior wall of the frame.

2. The separator of claim 1 wherein the extractor includes a chamber surrounding the fan and the tapered nozzle includes the nozzle inlet located at the frame and a nozzle outlet located adjacent to the fan, wherein the flow of air provided by the fan moves from the nozzle inlet to the nozzle outlet to provide the increased velocity to extract crop residue from the sugarcane mat.

3. The separator of claim 2 wherein the nozzle inlet includes a first perimeter and the nozzle outlet includes a second perimeter, wherein the first perimeter is smaller than the second perimeter to provide the tapered nozzle.

4. The separator of claim 3 further comprising a fan housing defining the chamber, wherein the fan housing includes a housing inlet and a housing outlet, wherein the second perimeter of the nozzle outlet is substantially the same size as a perimeter of the housing inlet.

5. The separator of claim 1 wherein the frame defines a space between the tapered nozzle and the interior wall of the frame, wherein the nozzle plate extends from the nozzle inlet to the interior wall to seal the space.

6. The separator of claim 1 further comprising a seal located at the nozzle plate and the nozzle inlet, wherein the seal is configured to provide a substantially airtight seal between the nozzle inlet and the aperture of the nozzle plate.

7. The separator of claim 1 wherein the cut sugarcane defines a path defining an arc and the nozzle inlet defines a plane generally parallel to a tangent line defined by the arc of the path.

8. A sugarcane harvester for harvesting sugarcane, the harvester comprising:
   a cutter configured to cut sugarcane into a sugarcane mat;
   a primary extractor disposed adjacent to the sugarcane mat configured to remove crop residue from the sugarcane mat;
   an elevator including a conveyor to move the sugarcane mat to an end of the conveyor;
   a frame having an interior wall, the frame located at an end of the conveyor; and
   an extractor operatively connected to the frame, the extractor including a tapered nozzle having an inlet, the tapered nozzle located within the frame, to remove crop residue from the sugarcane mat at the end of the conveyor; and
   a nozzle plate located within the frame and including an aperture operatively connected to the inlet of the tapered nozzle, wherein the nozzle plate extends from the nozzle inlet to the interior wall of the frame.

9. The sugarcane harvester of claim 8 further comprising a fan located adjacently to the tapered nozzle, wherein the tapered nozzle and the fan are configured to provide an air flow of increased velocity between the frame and the fan to extract crop residue from the sugarcane mat.

10. The sugarcane harvester of claim 9 wherein the frame includes a crop residue outlet, the extractor includes a chamber surrounding the fan, and the tapered nozzle includes the nozzle inlet, located at the crop residue outlet, and a nozzle outlet, located adjacent to the fan, and the flow of air provided by the fan moves from the nozzle inlet to the nozzle outlet to provide the increased pressure to extract crop residue from the sugarcane mat.

11. The sugarcane harvester of claim 10 wherein the nozzle inlet includes a first perimeter and the nozzle outlet includes a second perimeter, wherein the first perimeter is smaller than the second perimeter to provide the tapered nozzle.

12. The sugarcane harvester of claim 11 further comprising a fan housing defining the chamber, wherein the fan housing includes a housing inlet and a housing outlet.

13. The sugarcane harvester of claim 8 wherein the frame defines a space between the nozzle inlet and the interior wall of the frame, wherein the nozzle plate extends from the nozzle inlet to the interior wall to seal the space.

14. A method of harvesting sugarcane from a field of sugarcane, the method comprising:
   cutting sugarcane from the field of sugarcane to obtain a sugarcane mat of cut stalk and crop residue;
   delivering the cut stalk and the crop residue to a first chamber; and
   providing an air flow of increased velocity, between the first chamber and a second chamber to remove the crop residue from the sugarcane mat, with a tapered nozzle having an inlet connected to an aperture of a nozzle plate extending from the inlet to a frame of the sugarcane harvester.

15. The method of claim 14 wherein the providing an air flow of increased velocity includes providing an air flow of increased velocity with a fan located in the second chamber configured to draw air from the first chamber through the sugarcane mat.

16. The method of claim 15 wherein the providing an air flow of increased velocity includes locating a smaller end at the inlet of the tapered nozzle adjacently to the first chamber and locating a larger end of the tapered nozzle adjacently to the second chamber.

* * * * *

UNITED STATES PATENT AND TRADEMARK OFFICE
CERTIFICATE OF CORRECTION

PATENT NO. : 10,999,972 B2  
APPLICATION NO. : 16/178709  
DATED : May 11, 2021  
INVENTOR(S) : Matthew J. Hansen et al.

Page 1 of 1

It is certified that error appears in the above-identified patent and that said Letters Patent is hereby corrected as shown below:

In the Claims

In Column 7, Line 5, Claim 1: "remove crop reside from the mat; and"
To be replaced with: "remove crop residue from the mat; and"

Signed and Sealed this
Twenty-ninth Day of November, 2022

Katherine Kelly Vidal
*Director of the United States Patent and Trademark Office*